Dec. 21, 1926.　　　　　　　　　　　　　　　　　1,611,680
A. K. SAIKI
GRADE METER
Filed Sept. 30, 1925
Fig. 1
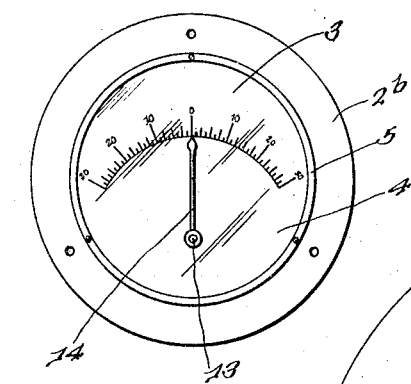
Fig. 3
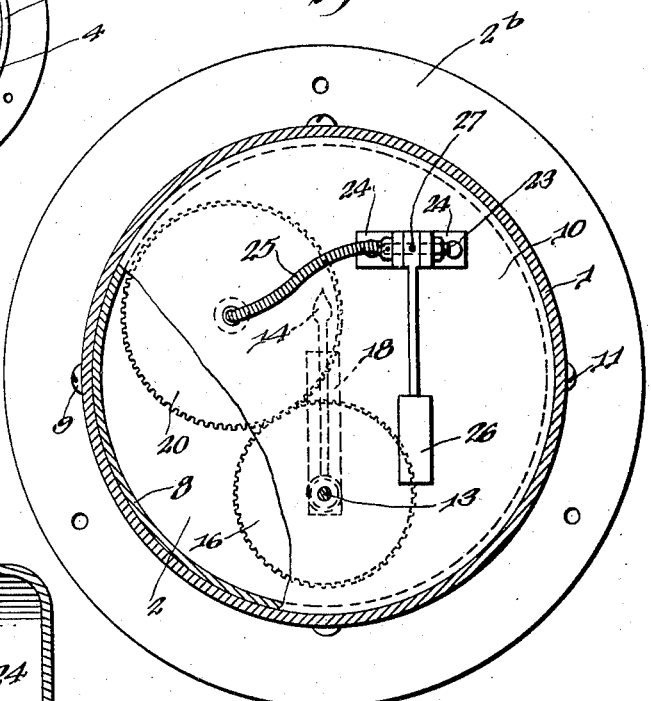
Fig. 2
Arthur K. Saiki
INVENTOR
BY Victor J. Evans
ATTORNEY Patented Dec. 21, 1926.

1,611,680

UNITED STATES PATENT OFFICE.

ARTHUR K. SAIKI, OF UNIVERSITY STATION, NORTH DAKOTA.

GRADE METER.

Application filed September 30, 1925. Serial No. 59,694.

This invention relates to indicating instruments for use in connection with automobiles and similar vehicles, and more particularly to what I term a grade meter. One of the main objects of the invention is to provide an instrument of simple construction and operation which, when mounted on the instrument board, or any other suitable location on an automobile, will indicate the grade of a hill or inclined surface upon which the automobile is travelling. A further object of the invention is to provide an instrument of this character which may be readily set for proper operation in connection with various mounting or supporting means for the instrument. Another object is to provide simple and efficient means whereby excessive vibration or trembling of the indicating needle is avoided. Further objects will appear from the detailed description.

In the drawings:

Fig. 1 is a front view of the instrument.

Fig. 2 is a transverse vertical section through the instrument, parts being shown in elevation.

Fig. 3 is a section taken in a plane adjacent the back wall of the instrument casing and at right angles to the plane or section 2, parts being broken away.

The instrument includes a suitable casing 1 in front of which is secured a front plate 2 adjacent the outer face of which is a dial 3 provided with a suitably graduated scale for indicating figures or other suitable units of measurement of the grade or inclination upon which the automobile is travelling, this scale being graduated in the opposite direction from a central or zero point, the graduations at one side of the zero point indicating up-grades and those at the other side indicating down-grades. A suitable closure member 4 is secured by a bezel 5 in the flange 2ª or front plate 2. The front plate is further provided with outer annular flange 2ᵇ by means of which the instrument can be attached to a supporting structure 6, such as the instrument board of an automobile, by means of screws 7 or in any other suitable or preferred manner. This front plate is also provided with an inwardly extending peripheral flange 8 which fits snugly into casing 1 and is secured thereto by screws 9, though any other suitable or preferred means for securing the front plate to the casing may be employed. An inner plate 10 is mounted in the casing 1 and is secured therein by means of screws 11 which are threaded into a peripheral flange 12 carried by the screw plate and coacting with flange 8 of the outer plate forming an inner supplemental casing which contains gears and associated parts for operating the instrument.

An operating shaft 13 is mounted through plates 2 and 10 for free turning movement, this shaft being also free for sliding movement in the direction of its axis. Shaft 13 is of such length that, when in its normal operating position, it extends through the back wall 1ª of casing 1 and through front plate 2, projecting beyond dial 3. A needle 14 is secured on the projecting portion of shaft 13 for movement over the dial scale, and a button 15 is secured on the end of shaft 13 which projects beyond the back wall 1ª of the casing. A pinion 16 is secured on the shaft 13 and the hub 17 of this pinion is normally held in contact with the front face of inner plate 10 by a leaf spring 18 which bears at one end against the front end of hub 17, this spring being secured at its other end, at 19, to plate 2. When shaft 13 is in operating position pinion 16 meshes with a gear 20 secured on the drive shaft 21 which is rotatably mounted through plate 10, the forward end of this shaft being supported by a boss 22 extending from the inner face of plate 2. A stub shaft 23 is rockably mounted in brackets 24 secured to the plate 10 and projecting rearwardly of casing 1 therefrom. This stub shaft is connected at one end, by means of a coil spring forming a flexible shaft 25, to the rearward end of shaft 21. A weight 26 is suspended from stub shaft 23 and is secured thereto at 27. This weight has swinging movement toward and away from plate 2 about a fixed axis, that is, about the axis of shaft 23, and this movement of the weight will impart turning movement to drive shaft 21 through the flexible shaft 25. Turning of the drive shaft 21 will result in turning of shaft 13 thus moving the needle 14 over the scale of the dial in accordance with the movement of the weight 26.

I have illustrated the instrument as supported in vertical position, with the needle 14 at zero of the dial scale, it being assumed that the instrument is mounted on an automobile which is supported upon a level or horizontal surface. Upon movement of the automobile onto an inclined surface or grade, the weight 26 will move so as to maintain its vertical position, this movement of the weight causing deflection of the needle over the dial surface and indicating the inclination or grade upon which the automobile is travelling. If the instrument is mounted at an inclination on the instrument board of the automobile, instead of in the vertical position, this inclination of the instrument is compensated for by means of the shaft 13 and associated parts. In such case, when the instrument is initially installed, shaft 13 is pushed inwardly a sufficient distance to disengage pinion 16 from gear 20 thus permitting weight 26 to assume a vertical position, and the shaft 13 is turned so as to position needle 14 at the zero point of the dial scale, after which the shaft 13 is released and spring 18 returns this shaft to its normal position to move the pinion into mesh with the gear. The instrument is thus quickly and easily adjusted for operation in connection with the individual mounting in connection with its use, after which it will operate in the manner previously described. As it is inevitable that there will be a certain amount of looseness or play between the teeth of the gear and pinion, it is desirable that means be provided to prevent excessive vibration or trembling of the needle when travelling on approximately horizontal surfaces. With this object in view, the spring or flexible shaft 25 is adjusted, when applied, so as to have a slight torsional or turning effect which will act to hold gear 20 in contact with the pinion 16, care being taken, however, not to have this turning effect sufficient to overcome the retarding or damping effect exerted by the spring 18 on shaft 13. By reference to Fig. 2 it will be seen that spring 18 presses the hub 17 of pinion 16 against the plate 10 thus offering a frictional resistance in turning the shaft 13 and producing a desirable damping effect on this shaft which insures smooth operation of the needle.

What I claim is:

1. In a grade meter, a dial, an operating shaft having turning movement and slidable in the direction of its axis, a needle operatively connected to the shaft and movable over the dial, a pinion secured on the shaft, a drive gear meshing with the pinion, means for moving the operating shaft in the direction of its axis to move the pinion out of mesh with said gear and for turning the shaft manually, a weight suspended for free swinging movement about a fixed axis, and operating connections between the weight and said gear for turning the latter in accordance with the movement of the weight.

2. In a grade meter, a dial, an operating shaft having turning movement and slidable in the direction of its axis, a needle operatively connected to the shaft and movable over the dial, a pinion secured on the shaft, a drive shaft disposed at right angles to the dial, a gear secured on the drive shaft and meshing with the pinion, means for normally holding the operating shaft in position with the pinions in mesh with said gear a stub shaft rockably mounted at right angles to the drive shaft, a weight suspended from said stub shaft and secured thereto, driving connections between the stub shaft and the drive shaft, and manually operated setting means for moving the operating shaft in one direction axially for moving the pinion out of mesh with the gear and turning said operating shaft for setting the needle, the operating shaft having limited sliding movement in its other direction.

3. In a grade meter, a casing, a front plate secured to the casing and provided on its outer face with a dial, an inner plate secured to the casing parallel with the front plate, an operating shaft loosely mounted through the plate and extended through the back wall of the casing, a needle secured on said shaft and movable over the dial, a drive shaft rotatably mounted in the plates, a gear secured on the drive shaft, the operating shaft having limited sliding movement away from the front plate, yielding means for holding the operating shaft in its operating position in a direction away from the front plate, a pinion secured on the operating shaft and meshing with said gear when the operating shaft is in operating position, a stub shaft rockably mounted at right angles to the operating shaft, driving connections between the stub shaft and the drive shaft and a weight having free movement toward and away from the inner plate.

4. In a grade meter, a casing, a front plate secured to the casing and provided on its outer face with a dial, an inner plate secured to the casing parallel with the front plate, an operating shaft loosely mounted through the plates and extended through the back wall of the casing, a needle secured on said shaft and movable over the dial, a drive shaft rotatably mounted in the plates, a gear secured on the drive shaft, a pinion secured on the operating shaft and meshing with the gear when the hub of the pinion contacts with the front face of the inner plate, a spring confined between the hub of the pinion and the front plates and acting to normally hold the operating shaft in operating position while permitting movement of the shaft into position to disengage the pinion from the gear, a stub shaft rockably mounted on the inner plate, a resilient flexible shaft establishing operating connections between the stub shaft and the drive shaft, and a weight secured to and suspended from the stub shaft and having movement toward and away from the inner plate.

5. In a grade meter, a casing, a front plate secured to the casing and provided on its outer face with a dial, an operating shaft loosely mounted in the casing and extending through the back wall thereof, said shaft also extending beyond the dial, a needle secured on the shaft for movement over the dial, a pinion secured on said shaft, a drive gear rotatably mounted in the casing, a weight suspended in the casing for movement about a fixed axis, yielding means for holding the operating shaft in operating position while permitting movement of the said operating shaft into position to disengage the pinion from the gear and dampening the turning movement of said shaft, and operating connections between the weight and the gear.

In testimony whereof I affix my signature.

ARTHUR K. SAIKI.